United States Patent [19]

Nakano et al.

[11] Patent Number: 5,379,661
[45] Date of Patent: Jan. 10, 1995

[54] LOADING CAM DEVICE

[75] Inventors: Masaki Nakano; Hiroshi Fukushima; Hisashi Machida, all of Kanagawa, Japan

[73] Assignees: NSK Ltd., Tokyo; Nissan Motor Co., Ltd., Kanagawa, both of Japan

[21] Appl. No.: 31,390

[22] Filed: Mar. 12, 1993

[30] Foreign Application Priority Data

Mar. 13, 1992 [JP] Japan .............. 4-021982[U]

[51] Int. Cl.⁶ .............. F16H 15/38; F16H 25/18
[52] U.S. Cl. .............. 74/99 A; 476/41; 192/93 A
[58] Field of Search ............. 476/40, 41; 192/93 A; 74/424.8 R, 99 A

[56] References Cited

U.S. PATENT DOCUMENTS

| | | | |
|---|---|---|---|
| 2,009,964 | 5/1935 | Motilau | 192/93 A X |
| 2,045,086 | 6/1936 | Kastner | 192/93 A X |
| 2,123,008 | 7/1978 | Hayes | 476/41 |
| 2,649,941 | 8/1953 | Doebeli | 192/93 A X |
| 3,087,348 | 4/1963 | Kraus | 476/41 X |
| 3,403,668 | 10/1968 | Schottler | 74/424.8 R X |
| 4,463,620 | 8/1984 | Horton | 476/41 |
| 5,070,975 | 12/1991 | Tanaka et al. | 192/93 A X |
| 5,073,159 | 12/1991 | Kurachi | 475/216 |

FOREIGN PATENT DOCUMENTS 62-71465  5/1987  Japan .
1-299358  12/1989  Japan .

Primary Examiner—Allan D. Herrmann
Attorney, Agent, or Firm—Wegner, Cantor, Mueller & Player

[57] ABSTRACT

A loading cam device is constructed of a first cam surface, a second cam surface, a ring-shaped retainer disposed between the first and second cam surfaces and defining pockets at angular intervals, and rolling members maintained in contact with the first and second cam surfaces while rotatably held within the respective pockets. The circumferential width of each pocket is smaller at each side of the retainer but greater along a thicknesswise central axis of the retainer, both compared with the outer diameter of the rolling members. As an alternative, the thickness of the retainer is a little smaller at a location adjacent to each pocket but significantly smaller at a location remote from the pocket, both compared with the thickness the outer diameter. As a further alternative, springs are disposed between surface portions of the retainer, said surface portions being on opposite sides of the retainer, respectively, and being located between each two adjacent pockets, and the first and second cam surfaces, whereby the springs resiliently urge the retainer in directions away from the first and second cam surfaces, respectively.

1 Claim, 6 Drawing Sheets

LOADING CAM DEVICE

FIELD OF THE INVENTION

This invention relates to a loading cam device employed in a state assembled in a continuously variable traction roller transmission which is in turn used, for example, as an automobile transmission.

DESCRIPTION OF THE RELATED ART

Use of a continuously variable traction roller transmission such as that shown in FIGS. 7 and 8, for example, as an automobile transmission has been studied. As disclosed in Japanese Utility Model Application Laid-Open (Kokai) No. SHO 62-71465, this continuously variable traction roller transmission is constructed of an input disk 2 as an input disk, an output disk 4 as an output disk, and power rollers 6,6 held as roller members between the input disk 2 and the output disk 4. The input disk 2 is supported on an end portion of an input shaft 1 while the output disk 4 is supported on an end portion of an output shaft 3. The power rollers 6,6, on the other hand, are rotatably supported on displaceable pins 5,5, respectively. Each displaceable pin 5 is arranged in such a way that the angle of its tilt is adjustable.

Mutually opposing inner walls 2a,4a of the input and output disks 2,4 are in the form of concave walls of a circular arc shape in cross-section, while peripheral walls 6a,6a of the respective power rollers 6,6 are in the form of spherical convex walls. The peripheral walls 6a,6a of the respective power rollers 6,6 are maintained in contact with the inner walls 2a,4a, respectively. Arranged between the input shaft 1 and the input disk 2 is a loading cam device 7 which is a presser mechanism for rotating the input disk 2 while pressing the input disk 2 toward the output disk 4.

The loading cam device 7 is provided with a first cam surface 9, a second cam surface 10, and plural rollers 12,12 held between the first cam surface 9 and the second cam surface 10 while being rotatably held in a ring-shaped retainer 11. The first cam surface 9 is formed as concavities and convexities alternately arranged in a circumferential direction on one side (the right-hand side as viewed in FIGS. 7-8) of a cam flange 8, whereas the second cam surface 10 is formed as concavities and convexities alternately arranged in a circumferential direction on an opposing side (the left-hand side as viewed in FIGS. 7-8) of the input disk 2.

As the rollers 12,12, those disclosed, for example, in Japanese Patent Application Laid-Open (Kokai) No. HEI 1-299358 can be used. Each roller 12 disclosed in this patent publication has been constructed by combining roller elements 14,14, each of which has a small height and is provided with a small-diameter projection 13 centrally formed on one end face thereof as depicted in FIG. 9, in series as illustrated in FIG. 10. The rollers 12,12, each of which has been formed by combining such plural roller elements 14,14, are used while being ratably held within corresponding rectangular pockets 15,15 formed at angular intervals in the retainer 11. During use, the individual roller elements 14,14 rotate independently from one another. This is to absorb a difference between a rotational speed on a side of an inner circumference and that on a side of an outer circumference.

In a continuously variable traction roller transmission with the so-constructed loading cam device 7 assembled therein, the first cam surface 9 pressed the plural rollers 12,12 against the second cam surface 10 when the cam flange 8 is rotated by the input shaft 1. As a result, the input disk 2 is pushed toward the output disk 4 so that the inner walls 2a,4a of the disks 2,4 and the peripheral walls 6a,6a of the respective power rollers 6,6 are brought into firm contact with each other. Based on engagement of the individual roller 12,12 with the convexities of the second cam surface 10, the input disk 2 is rotated. The rotation of the input disk 2 is then transmitted to the output disk 4 via the respective power rollers 6,6, so that the output shaft 3 with the output disk 4 fixed thereon is rotated in a direction opposite to the input shaft 1. Incidentally, a lubricant is fed between the first and second cam surfaces 9,10 and the rollers 12,12 to prevent seizure which otherwise occurs when they are pressed against each other.

Upon transmission of rotation from the input shaft 1 to the output shaft 3 as described above, a reduction in rotational speed takes place between the input shaft 1 and the output shaft 3 when, as shown in FIG. 7, the individual displaceable pins 5,5 are tilted so that the peripheral walls 6a,6a of the respective power rollers 6,6 are brought into contact with a center-side part of the inner wall 2a of the input disk 2 and also with an outer-periphery-side part of the inner wall 4a of the output disk 4. Conversely, when the individual displaceable pins 5,5 are tilted so that the peripheral walls 6a,6a of the respective power rollers 6,6 are brought into contact with an outer-periphery-side part of the inner wall 2a of the input disk 2 and also with a center-side part of the inner wall 4a of the output disk 4 as illustrated in FIG. 8, an increase in rotational speed takes place between the input shaft 1 and the output shaft 3. When the angle of tilt of the respective displaceable pins 5,5 is set at values between those shown in FIG. 7 and FIG. 8, respectively, intermediary speed change ratios can be obtained between the input shaft 1 and the output shaft 3.

FIG. 11 illustrates the continuously variable traction roller transmission, which is constructed and operates as described above, as assembled in an actual transmission such as a transmission for a light vehicle. For details, reference may be had to U.S. Pat. No. 5,073,159 which is incorporated herein by reference. Rotational drive force, which has been transmitted to a gear 16 via an unillustrated power transmission mechanism and then to a power transmission shaft 18 via a gear 17 maintained in meshing engagement with the gear 16, is transmitted to the input shaft 1 of a continuously variable traction roller transmission 20 via a clutch device 19.

While the clutch device 19 is connected, rotational drive force of the power transmission shaft 18 is therefore transmitted to the output disk 4 via the input shaft 1, the loading cam device 7, the input disk 2, and the power rollers 6,6 rotatable about the displaceable pins 5,5, respectively. This rotational drive force is then outputted via a gear 22, which is fixedly secured on an outer wall of a cylindrical portion 21 fixed on an outer side wall 4b of the output disk 4 and functioning as an output shaft, and a gear 23 maintained in meshing engagement with the gear 23.

To permit actual use of the loading cam device, which is constructed and operates as described above, by assembling same in a continuously variable traction roller transmission, it is necessary to improve such problems as will be described next.

While the loading cam device 7 is not operated, in other words, no rotation is transmitted from one cam flange 8 to the input disk 2, the first cam surface and the second cam surface 10 are located close to each other as shown in FIG. 12 so that the retainer 11 is not displaced substantially in the thicknesswise direction (i.e., the vertical direction as viewed in FIG. 12) of the retainer 11. The rollers 12,12 held in the corresponding pockets 15,15 of the retainer 11 are therefore not displaced substantially in the thicknesswise direction of the retainer 11, that is, in the vertical direction as viewed in FIG. 12.

During operation of the loading cam device 7, in other words, while rotation is transmitted from the cam flange 8 to the input disk 2, on the other hand, the first cam surface 9 and the second cam surface 10 tend to move away from each other as illustrated in FIG. 13. As a result, the retainer 11 can be displaced substantially in the thicknesswise direction thereof so that the rollers 12,12 held inside the pockets 15,15 tend to substantially move out of the pockets 15,15.

No particular problem however arises as long as variations in a torque transmitted via the loading cam device 7 remain small. When a large torque or the like is suddenly applied to the cam flange 8, however, the distance between the first cam surface 9 and the second cam surface 10 increases so that the first cam surface 9 and the second cam surface 10 are separated considerably from each other. It is hence possible that the rollers 12,12 would substantially jut out of the corresponding pockets 15,15. If the rollers 12,12 jut out of the corresponding pockets 15,15 as described above, roller surfaces 12a,12a of the rollers 12,12 come into contact with edges 15a,15a of the pockets 15,15 so that the durability of the roller surfaces 12a,12a is impaired. Further, lubrication between the first and second cam surfaces 9,10 and the rollers 12,12 becomes uneven. Where projections 13,13 are formed on end faces of the individual elements 14,14 of the rollers 12,12, these projections 13,13 may be brought into engagement with end edges of the pockets 15,15. If this engagement takes place, the rollers 12,12 are no longer allowed to return to the interiors of the pockets 15,15 even when the distance between the first cam surface 9 and the second cam surface 10 begins to decrease.

SUMMARY OF THE INVENTION

An object of the present invention is to provide a loading cam device which is substantially free of the inconveniences described above.

In one aspect of the present invention, there is thus provided a loading cam device constructed of a first cam surface having concavities and convexities alternately arranged in a circumferential direction, a second cam surface having concavities and convexities alternately arranged in a circumferential direction and located axially opposite the first cam surface, a ring-shaped retainer disposed between the first cam surface and the second cam surface and defining plural pockets formed at angular intervals in the retainer, and a like plural number of rolling members maintained in contact with the first and second cam surfaces while rotatably held within the respective pockets. The circumferential width of each pocket at each side of the retainer as viewed in the thicknesswise direction of the retainer is smaller than the outer diameter of the corresponding rolling member but the circumferential width of each pocket along a thicknesswise central axis of the retainer is greater than the outer diameter of the corresponding rolling member.

In another aspect of the preset invention, there is also provided a loading cam device constructed as described above. The thickness of the retainer is set greater at a location adjacent to each pocket to have a value a little smaller than the outer diameter of the corresponding rolling element but is set smaller at a location remote from the pocket to have a value significantly smaller than the thickness at the location adjacent to the pocket.

In a further aspect of the present invention, there is also provided a loading cam device constructed as described above. Springs are disposed between surface portions of the retainer, said surface portions being on opposite sides of the retainer, respectively, as viewed in the direction of the thickness of the retainer and being located between each two adjacent pockets, and the first and second cam surfaces, whereby the springs resiliently urge the retainer in directions away from the first and second cam surfaces, respectively.

When assembled in a continuously variable traction roller transmission and employed to transmit rotation from an input shaft to an input disk while pressing the input disk in an axial direction, each of the above loading cam devices according to the present invention operates in a similar manner to the above-described conventional loading cam device assembled in the conventional continuously variable traction roller transmission.

In the loading cam device according to each aspect of the present invention, the retainer is limited at substantially a central position between the first cam surface and the second cam surface even when the first and second cam surfaces are substantially separated from each other. Therefore the rolling members no longer have the tendency to substantially move out from the corresponding pockets of the retainer so that the surfaces of the rolling members will be prevented from contacting edge portions of the pockets. In addition, the lubrication between the rolling members and the cam surfaces does not become uneven. Even when the rolling members are provided with a projection, the rolling members are still allowed to return to the interiors of the corresponding pockets.

Since the loading cam device according to each aspect of the present invention is constructed and operates as described above, it is possible to surely prevent the occurrence of a malfunction which would otherwise take place due to dislocation of the rolling members out of the pockets of the retainer. It is hence possible to stabilize operation of a continuously variable traction roller transmission.

DETAILED DESCRIPTION OF THE INVENTION AND PREFERRED EMBODIMENTS

Certain preferred embodiments of the present invention will hereinafter be described. A primary characteristic feature of the present invention resides in that the rolling members are prevented from substantially moving out of the pockets even when the first cam surface and the second cam surface are separated considerably from each other. The construction and operation of the remaining parts are similar to those of the conventional loading cam device described above, so that their illustration and description are omitted herein.

Figure 1:
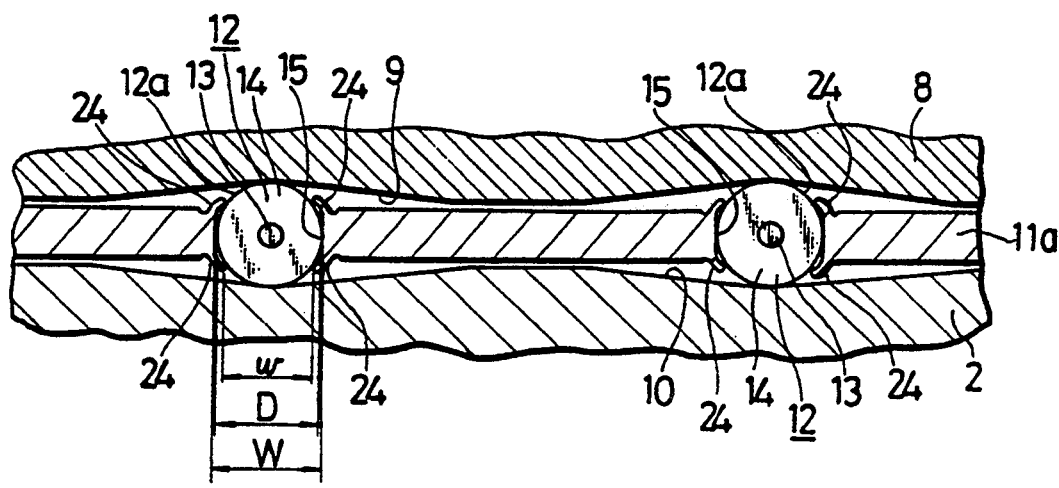
FIG. 1 is a fragmentary cross-sectional view of a loading cam device according to a first embodiment of the present invention as cut in a circumferential direction.
Figure 10:
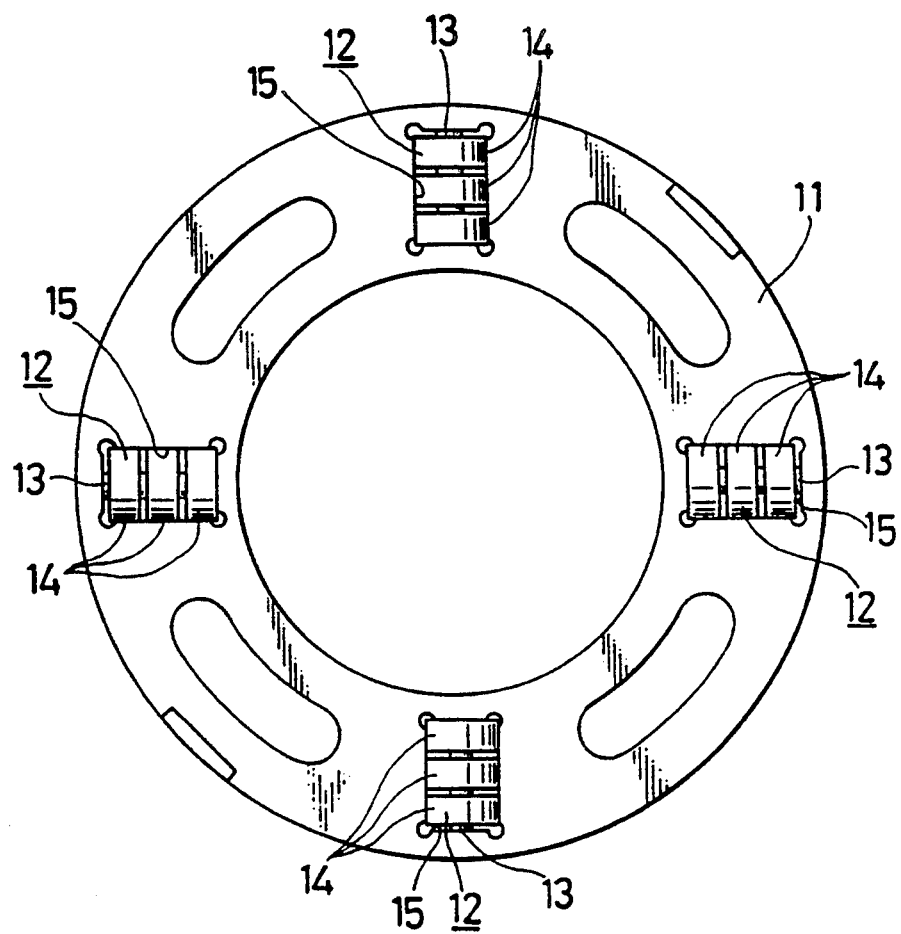
FIG. 10 is a front view showing rollers held in a retainer.
Figure 11:
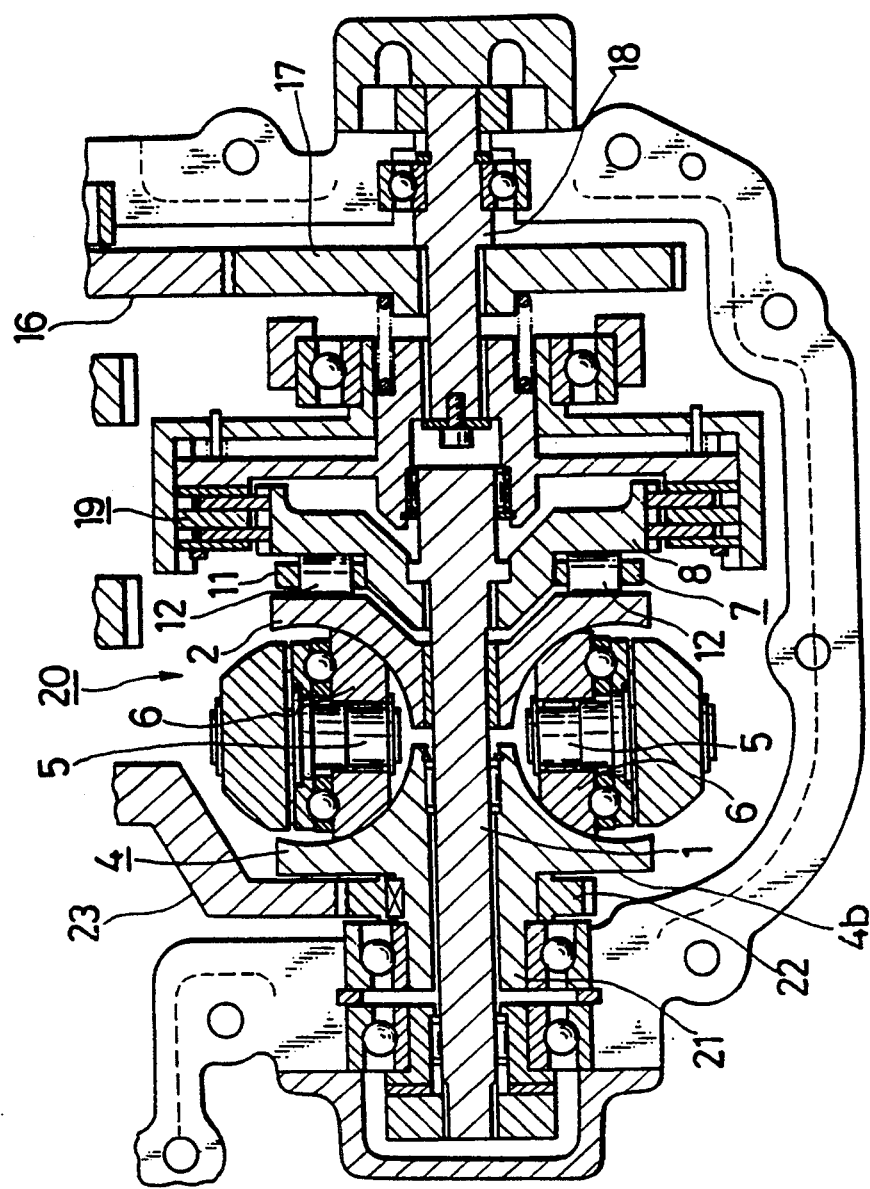
FIG. 11 is a fragmentary, transverse cross-sectional view depicting a continuously variable traction roller transmission as assembled in an automobile transmission.
Figure 12:
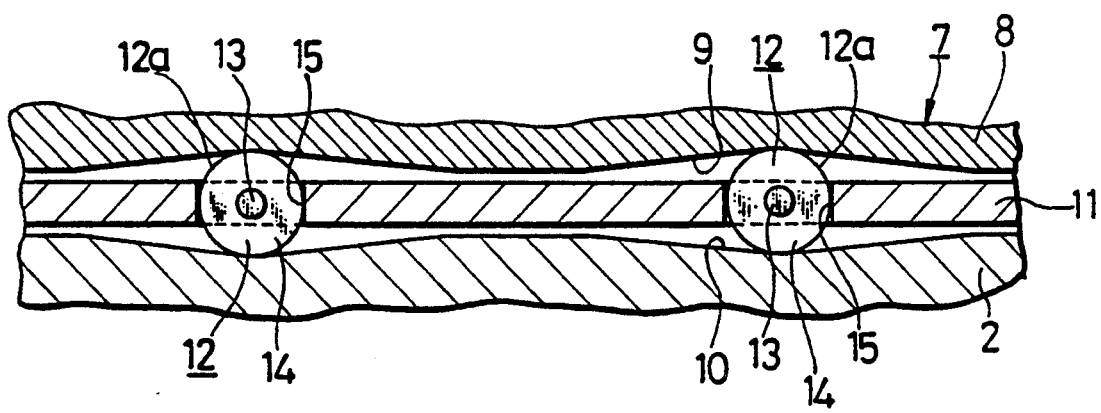
FIG. 12 is a cross-sectional view similar to FIG. 1 but illustrates the loading cam device in a non-operated state.

Referring now to FIG. 1, the first embodiment of the present invention will be described. As is illustrated in FIG. 10, a ring-shaped retainer 11a is disposed between the first cam surface 9 and the second cam surface 10 and defines therein plural pockets 15,15 formed at angular intervals, and a like plural number of rollers 12,12 having roller surfaces 12a,12a, respectively, are rotatably held within the respective pockets 15,15. At each side of the retainer 11a, both circumferential edges of an opening of each pocket 15 are crimped toward the interior of the pocket 15 so that brink portions 24,24 are formed.

The circumferential width w of the opening of each pocket 15, said width being the distance between proximal ends of the brink portions 24,24 formed opposing each other, is smaller than the outer diameter D of the roller 12, while the circumferential width W of each pocket 15 along a thicknesswise central axis of the retainer 11a is greater than the outer diameter D of the roller 12 (w<D<W). Incidentally, the circumferential central axis of the retainer 11a extends through a midpoint between the brink portion 24 of each circumferential edge of each pocket 15 on one side (which may hereinafter be called the "front side") of the retainer 11a and the brink portion 24 of the same circumferential edge of the same pocket 15 on the other side (which may hereinafter be called the "rear side") of the retainer 11a.

Figure 13:
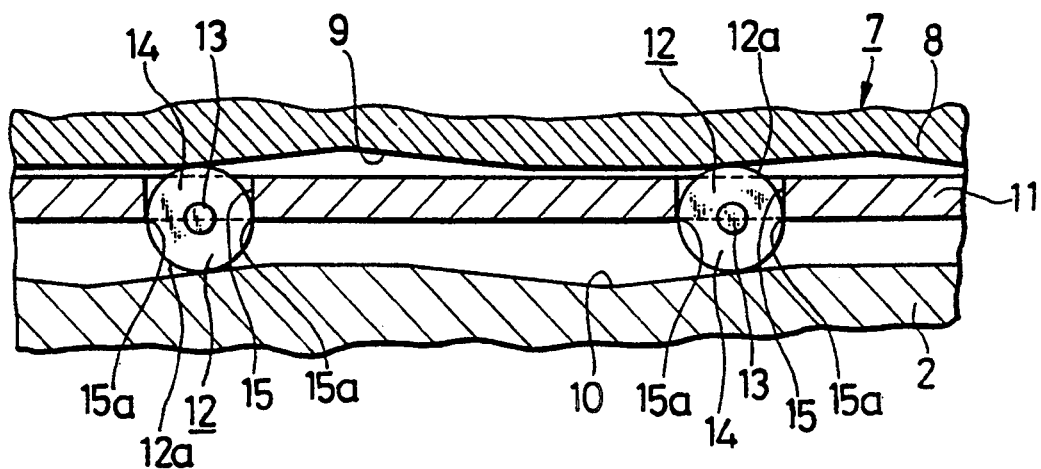
FIG. 13 is a cross-sectional view similar to FIG. 1 but illustrates the loading cam device in an operated state.

In the loading cam device constructed as described above, said loading cam device pertaining to the first embodiment of this invention, the circumferential width w of the opening of each pocket 15 is smaller than the outer diameter D of the roller 12 so that the roller 12 is prevented from moving out of the pocket 15. Even when the loading cam device according to the first embodiment of this invention is assembled in a continuously variable traction roller transmission and, as a result of transmission of rotational force between the cam flange 8 having the first cam surface 9 formed thereon and the input disk 2 having the second cam surface 10 formed thereon, the first cam surface 9 and the second cam surface 10 are substantially separated from each other as illustrated in FIG. 13, the retainer 11a is maintained limited at substantially a central position between both the cam surfaces 9 and 10. Accordingly, each roller 12 does not tend to substantially move out of the corresponding pocket 15 of the retainer 11a.

Figure 9:
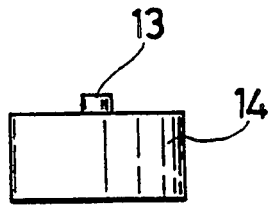
FIG. 9 is a front view depicting one of elements which are combined together to construct a roller.

As a result, the roller surface 12a of each roller 12 is prevented from coming into contact with the edges of the corresponding pocket 15. Further, lubrication between the first and second cam surfaces 9,10 and the rollers 12,12 is prevented from becoming uneven. As is illustrated in FIGS. 9 and 10, each roller 12 is composed of elements 14,14,14 stacked one over another, and each element 14 is provided at an end face thereof with a projection 13. According to the first embodiment of the present invention, the projection 13 of the uppermost element 14 is prevented from engaging with the opposing edge of the pocket 15, thereby eliminating the potential problem that the roller 12 would become unable to return to the interior of the corresponding pocket 15. It is to be noted that the projections 24,24 formed at both the circumferential edges of each pocket are not absolutely required to extend out from both the front and rear sides of the retainer 11a as shown in FIG. 1.

Figure 2:
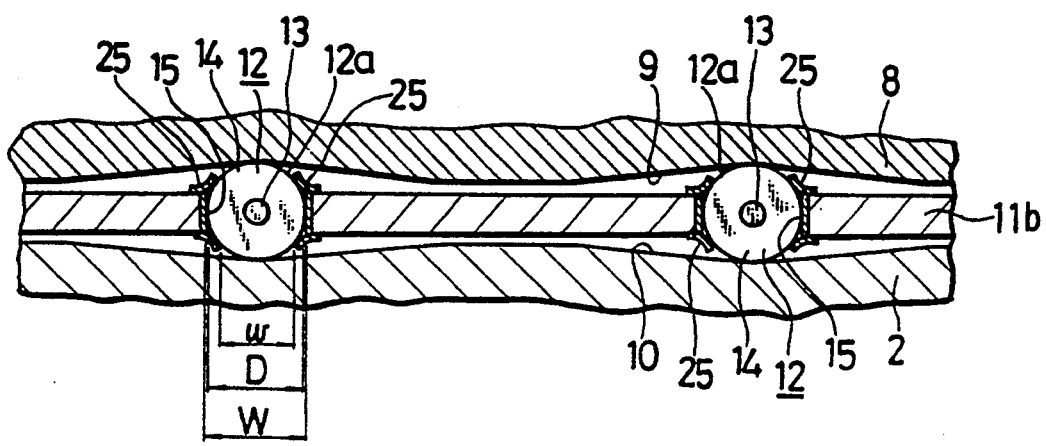
FIG. 2 is a similar fragmentary cross-sectional view to FIG. 1 but shows a second embodiment of the present invention.

Referring next to FIG. 2, the second embodiment of the present invention will be described. Presser spring 25,25 are applied to both circumferential edges of an opening of each pocket 15, respectively. The width w between both the presser springs 25 and 25 at each side of a retainer 11a is smaller than the outer diameter D of the roller 12, while the width W between the presser springs 25 and 25 along the circumferential central axis of the retainer 11a is greater than the outer diameter D of the roller 12 (w<D<W). The remaining construction of the second embodiment and the operation of the second embodiment are as in the first embodiment described above.

Figure 3:
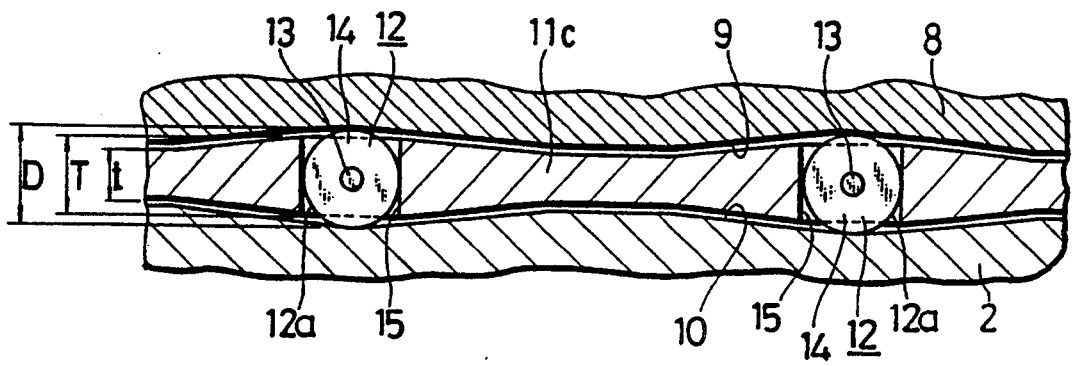
FIG. 3 is a similar fragmentary cross-sectional view to FIG. 1 but shows a third embodiment of the present invention.

Reference is next made to FIG. 3, which depicts the third embodiment of the present invention. Front and rear sides of a retainer 11a are formed with alternating concavities and convexities which substantially conform in configurations with the first and second cam surfaces 9,10, respectively. The thickness of the retainer 11c is set greater at a location adjacent to each pocket 15. Namely, the thickness T of the retainer 11c at the location adjacent to each pocket 15 is set a little smaller than the outer diameter D of the roller 12 but the thickness t of the retainer 11c at a location remote from the pocket 15 is set significantly smaller than the thickness T at the location adjacent to the pocket 15 (D>T t).

In the loading cam device of the third embodiment constructed as described above, the position of the retainer 11c is limited at substantially a central position between the first cam surface 9 and the second cam surface 10 even when these cam surfaces are separated substantially from each other upon operation of a continuously variable traction roller transmission in which the loading cam device has been assembled. Each roller 12 therefore does not tend to substantially move out of the corresponding pocket 15 of the retainer 11c and, coupled with the greater thickness T of the retainer 11c at the pocket 15, the roller surface 12a of the roller 12 does not come into contact with the edges of the pocket 15. Further, lubrication between the first and second cam surfaces 9,10 and the rollers 12,12 is prevented from becoming uneven. Furthermore, each roller 12 is free from the potential problem that it would become unable to return to the interior of the corresponding pocket 15.

Figure 4:
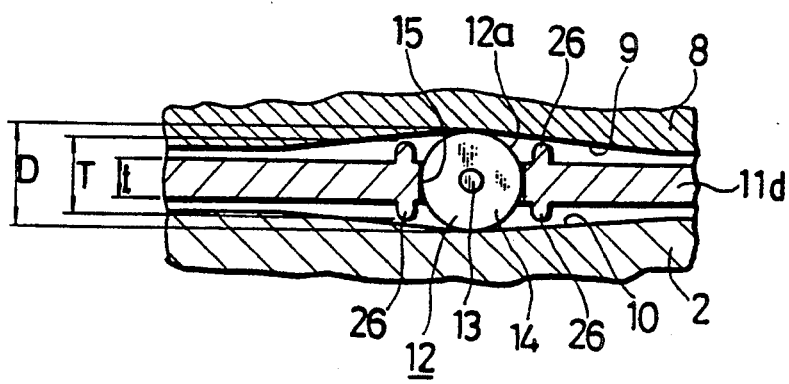
FIG. 4 is a similar fragmentary cross-sectional view to FIG. 1 but shows a fourth embodiment of the present invention.
Figure 5:
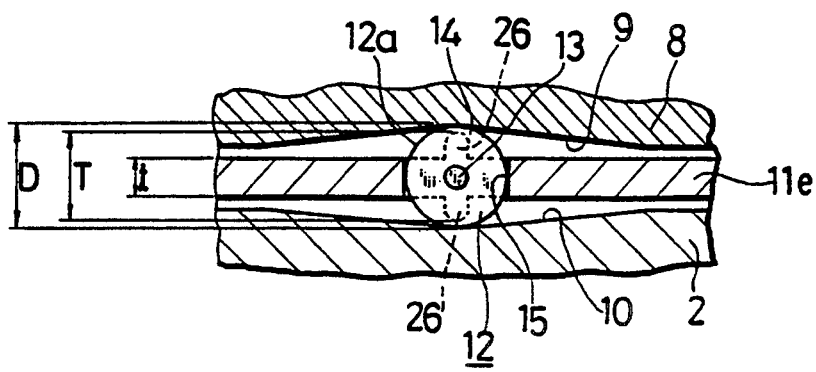
FIG. 5 a similar fragmentary cross-sectional view to FIG. 1 but shows a fifth embodiment of the present invention.

Now, reference is had to FIGS. 4 and 5 which depicts the fourth and fifth embodiments of the present invention, respectively. In these embodiments, raised portions 26,26 are formed on each of front and rear sides of a retainer 11d at locations flanking each pocket 15 from both sides in a circumferential direction (the fourth embodiment shown in FIG. 4) or at locations flanking each pocket 15 from both sides in a thicknesswise direction of the retainer 11e (the fifth embodiment shown in FIG. 5). It is important to provide the raised portions 26,26 without interference with the cam surfaces 9,10. In each of the fourth and fifth embodiments, the thickness T of the retainer 11d or 11e at a location adjacent to each pocket 15 is set a little smaller than the outer diameter D of the roller 12 but the thickness t of the retainer 11d or 11e at a location remote from the pocket 15 is set significantly smaller than the thickness T at the location adjacent to the pocket 15 (D>T t).

In each of the fourth and fifth embodiments, the position of the retainer 11d or 11e is also limited at substantially a central position between both the cam surfaces 9 and 10 even when the first cam surface 9 and the second cam surface 10 are separated substantially from each other. Each roller 12 therefore does not tend to substantially move out of the corresponding pocket 15 so that the roller surface 12a of the roller 12 is prevented from coming into contact with the edges of the corresponding pocket 15. Further, lubrication between the first and second cam surfaces 9,10 and the rollers 12 is prevented from becoming uneven. Furthermore, each roller 12 is free from the potential problem that it would become unable to return to the interior of the corresponding pocket 15.

Figure 6:
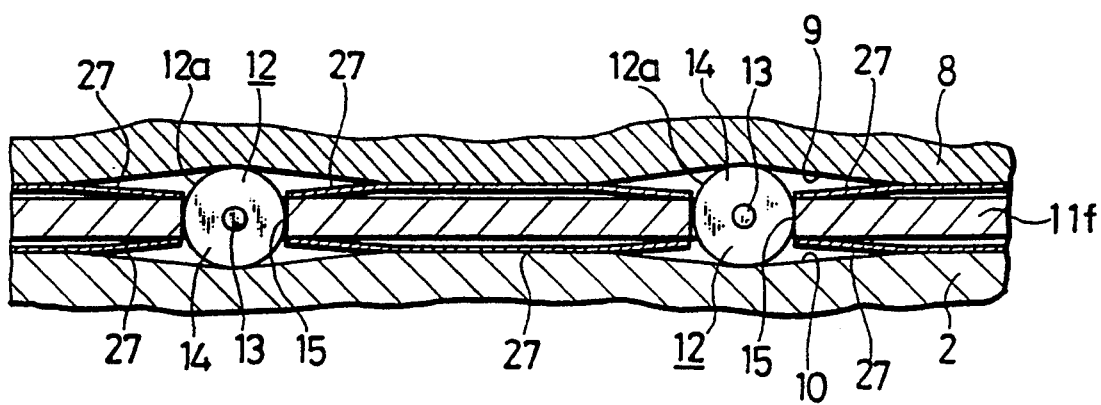
FIG. 6 a similar fragmentary cross-sectional view to FIG. 1 but shows a sixth embodiment of the present invention.
Figure 7:
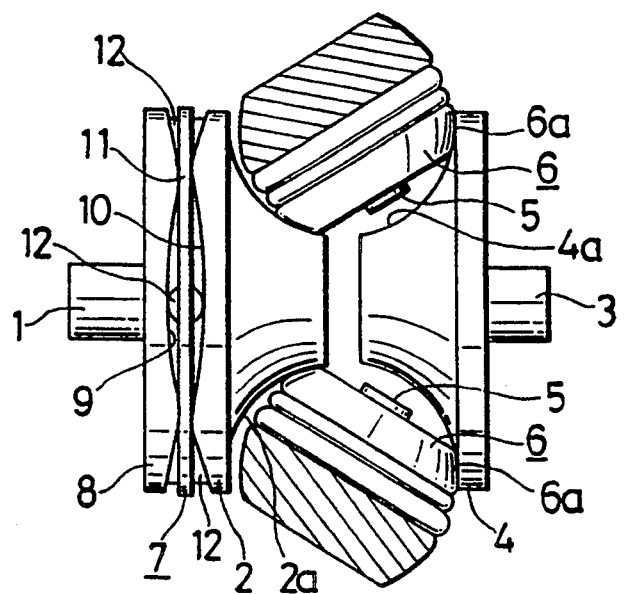
FIG. 7 a side view showing the basic construction of a continuously variable traction roller transmission at a maximum rotational speed reduction ratio.
Figure 8:
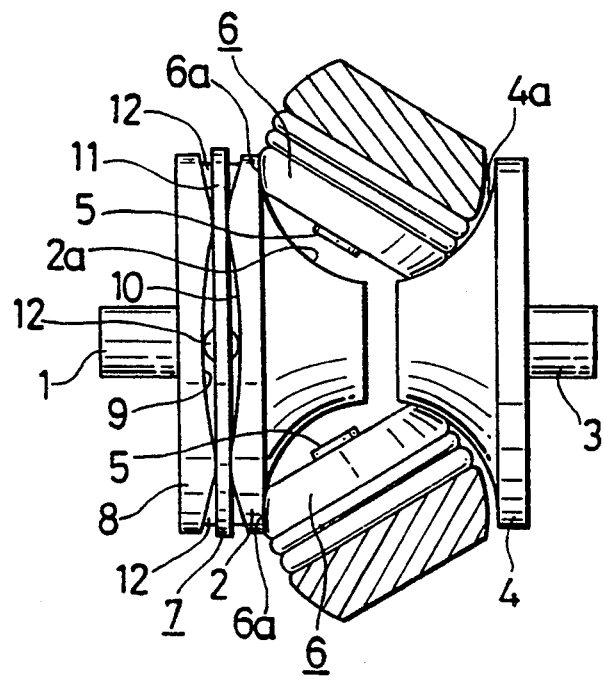
FIG. 8 is similar side view to FIG. 7 but illustrates the continuously variable traction roller transmission at a maximum rotational speed increase ratio.

FIG. 6 illustrates the sixth embodiment of the present invention. Leaf springs 27,27 are disposed between surface portions of a retainer 11f and the first and second cam surfaces 9,10, respectively. The surface portions are on opposite sides, that is, front and rear sides of the retainer 11f, respectively, and are located between each two adjacent pockets 15,15. These leaf springs 27,27 therefore urge the retainer 11f in directions away from the first and second cam surfaces 9,10, respectively.

In the sixth embodiment, the position of the retainer 11f is also limited at substantially a central position between both the cam surfaces 9 and 10 even when the first cam surface 9 and the second cam surface 10 are separated substantially from each other. Each roller 12 therefore does not tend to substantially move out of the corresponding pocket 15 so that the roller surface 12a of the roller 12 is prevented from coming into contact with the edges of the corresponding pocket 15. Further, lubrication between the first and second cam surfaces 9,10 and the rollers 12 is prevented from becoming uneven. Furthermore, each roller 12 is free from the potential problem that it would become unable to return to the interior of the corresponding pocket 15.

The present invention has been described based on the specific embodiments. It is however to be noted that the present invention is not limited to these specific embodiments. For example, the rollers as rolling members can be used without any projection. Needless to say, the loading cam device according to each of the first to sixth embodiments operates in exactly the same manner even when balls are used as rolling members instead of the rollers and grooves are formed in the cam surfaces to allow the balls to rotate therein.

We claim:

1. In a loading cam device constructed of:
    a first cam surface having concavities and convexities alternately arranged in a circumferential direction,
    a second cam surface having concavities and convexities alternately arranged in a circumferential direction and located axially opposite the first cam surface,
    a ring-shaped retainer disposed between the first cam surface and the second cam surface and defining plural pockets formed at angular intervals in the retainer, and
    a like plural number of rolling members maintained in contact with the first and second cam surfaces while rotatably held within the respective pockets,
    the improvement wherein the thickness of the retainer is set greater at a location adjacent to each pocket to have a value a little smaller than the outer diameter of the corresponding rolling element but is set smaller at a location remote from the pocket to have a value smaller than the thickness at the location adjacent to the pocket, so that raised portions are formed at locations flanking each pocket from both sides in a thicknesswise direction of the retainer.

* * * * *